United States Patent
Shin

(10) Patent No.: US 9,481,362 B2
(45) Date of Patent: Nov. 1, 2016

(54) DRIVING CONTROL APPARATUS AND METHOD FOR HYBRID VEHICLE

(71) Applicants: Hyundai Motor Company, Seoul (KR); Kia Motors Corporation, Seoul (KR)

(72) Inventor: Dong Jun Shin, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/658,145

(22) Filed: Mar. 14, 2015

(65) Prior Publication Data

US 2016/0129904 A1  May 12, 2016

(30) Foreign Application Priority Data

Nov. 10, 2014  (KR) .................. 10-2014-0155692

(51) Int. Cl.
| | |
|---|---|
| *B60W 20/40* | (2016.01) |
| *B60W 10/06* | (2006.01) |
| *B60W 10/08* | (2006.01) |
| *B60W 20/10* | (2016.01) |
| *B60W 30/182* | (2012.01) |
| *B60W 20/00* | (2016.01) |

(52) U.S. Cl.
CPC .............. *B60W 20/40* (2013.01); *B60W 10/06* (2013.01); *B60W 10/08* (2013.01); *B60W 20/10* (2013.01); *B60W 30/182* (2013.01); *B60W 2520/10* (2013.01); *B60W 2550/142* (2013.01); *B60W 2710/06* (2013.01); *B60W 2710/08* (2013.01); *Y10S 903/93* (2013.01)

(58) Field of Classification Search
CPC .... B60W 20/40; B60W 10/06; B60W 10/08; B60W 30/0182; B60W 20/10; B60W 2550/142; B60W 2710/08; B60W 2520/10; B60W 2710/06; Y10S 903/93
USPC .............................................................. 701/22
See application file for complete search history.

(56) References Cited

U.S. PATENT DOCUMENTS

2005/0209760 A1  9/2005  Tabata et al.
2007/0112496 A1  5/2007  Ji (Continued)

FOREIGN PATENT DOCUMENTS

JP   H0648190 A   2/1994
JP   H06187595 A  7/1994

(Continued)

OTHER PUBLICATIONS

Office Action issued on Apr. 25, 2016 in corresponding Korean Application No. KR 10-2014-0155692.

*Primary Examiner* — Brian P Sweeney
(74) *Attorney, Agent, or Firm* — Mintz Levin Cohn Ferris Glovsky and Popeo, P.C.; Peter F. Corless

(57) ABSTRACT

A driving control apparatus and method for a hybrid vehicle are provided. The apparatus includes a vehicle speed calculator that is configured to detect a driving speed of the vehicle and output information regarding the detected driving speed. An inclination sensor is configured to detect an inclination of a road on which the vehicle is being driven and output information regarding the detected inclination. In addition, a mode shift controller is configured to determine a driving load of the vehicle based on the driving speed and the inclination and execute the driving mode of the vehicle based on a magnitude of the driving load.

13 Claims, 3 Drawing Sheets

| GRADIENT DIVISION \ VEHICLE SPEED DIVISION | SUPERLOW SPEED | LOW SPEED | MIDDLE SPEED | HIGH SPEED | SUPERHIGH SPEED |
|---|---|---|---|---|---|
| FLAT | ■ | ■ | ■ | ■ | ● |
| SLOPE ROAD (SMALL) | ■ | ■ | ■ | ● | ● |
| SLOPE ROAD (MIDDLE) | ■ | ■ | ● | ● | ● |
| SLOPE ROAD (LARGE) | ● | ● | ● | ● | ● |

● :ENGINE ONLY CONTROL ENTRY AREA (NEW)
■ :EV/HEV MODE SHIFT CONTROL ENTRY AREA (EXISTING)

(56) References Cited

U.S. PATENT DOCUMENTS

| | | |
|---|---|---|
| 2007/0259755 A1 | 11/2007 | Tanishima |
| 2009/0069965 A1 | 3/2009 | Tabata et al. |
| 2009/0069966 A1 | 3/2009 | Tabata et al. |
| 2009/0075774 A1 | 3/2009 | Tabata et al. |
| 2014/0046525 A1* | 2/2014 | Lee .................. B60W 10/10 701/22 |

FOREIGN PATENT DOCUMENTS

| | | |
|---|---|---|
| JP | 2002-017922 A | 1/2002 |
| KR | 10-2007-0052478 | 5/2007 |
| KR | 10-2007-011243 A | 11/2007 |
| KR | 10-2007-0112430 A | 11/2007 |
| KR | 10-2009-0001593 A | 1/2009 |
| KR | 10-2012-0126143 A | 11/2012 |

* cited by examiner

| VEHICLE SPEED DIVISION / GRADIENT DIVISION | SUPERLOW SPEED | LOW SPEED | MIDDLE SPEED | HIGH SPEED | SUPERHIGH SPEED |
|---|---|---|---|---|---|
| FLAT | ■ | ■ | ■ | ■ | ● |
| SLOPE ROAD (SMALL) | ■ | ■ | ■ | ● | ● |
| SLOPE ROAD (MIDDLE) | ■ | ■ | ● | ● | ● |
| SLOPE ROAD (LARGE) | ● | ● | ● | ● | ● |

● : ENGINE ONLY CONTROL ENTRY AREA (NEW)

■ : EV/HEV MODE SHIFT CONTROL ENTRY AREA (EXISTING)

FIG.2

DRIVING CONTROL APPARATUS AND METHOD FOR HYBRID VEHICLE

CROSS-REFERENCE TO RELATED APPLICATION

This application is based on and claims the benefit of priority to Korean Patent Application No. 10-2014-0155692, filed on Nov. 10, 2014 in the Korean Intellectual Property Office, the disclosure of which is incorporated herein in its entirety by reference.

TECHNICAL FIELD

The present disclosure relates to a hybrid vehicle, and more particularly, to a driving control apparatus and method for a hybrid vehicle that improves fuel efficiency by prohibiting a shift between a hybrid electric vehicle (HEV) mode and an electric vehicle (EV) mode when a specific condition is satisfied in the hybrid vehicle.

BACKGROUND

A hybrid vehicle is a type of vehicle that is driven by combining at least two types of different power sources, and is often driven by an engine that obtains a torque by combusting fuel (e.g., fossil fuel such as gasoline) and an electric motor that obtains a torque by battery power. The hybrid vehicle is an environmentally friendly vehicle which adopts an engine and an electric motor as an auxiliary power source to reduce exhaust gas and enhance fuel efficiency. Research regarding hybrid vehicles has been actively conducted to meet the current demands of enhancing fuel efficiency and developing environmentally-friendly products.

Further, a hybrid vehicle obtains a driving force by a driving motor when the vehicle departs or is driven at a substantially low speed since engine efficiency is lower than motor efficiency during an initial departure of the vehicle and therefore it is advantageous to start the initial departure (vehicle starting) of the vehicle by the driving motor having efficiency greater than the engine in terms of fuel efficiency of a vehicle. A starter and generator, that is, a hybrid starter and generator (HSG) which operates an engine to provide (that is, output a cranking torque) a torque after the vehicle departs starts the engine and thus may simultaneously use an engine output and a motor output.

Accordingly, a hybrid vehicle is driven in a driving mode such as an electric vehicle (EV) mode which is a pure electric vehicle mode using the torque of the driving motor to drive the vehicle and a hybrid electric vehicle (HEV) mode which uses the torque of the driving motor as auxiliary power while using the torque of the engine as main power. In particular, the HSG starts the engine, and thus a mode conversion is performed from the EV mode to the HEV mode.

Meanwhile, the mode conversion between the EV mode and the HEV mode in the hybrid vehicle is one of the main functions, which is a factor affecting drivability, fuel efficiency, and power performance of the hybrid vehicle. A full hybrid type vehicle optimally controls an engine on/off (HEV/EV mode) to reduce fuel consumption. However, when driving resistance is increased, for example, when a substantial amount of driving power due to an uphill inclination, high-speed driving at which air resistance is increased, overloading or traction, or the like is required, the HEV/EV mode shift control which is performed while being driven under general driving conditions may not be appropriate. For example, system efficiency may be reduced due to a frequent mode shift when the vehicle is driven under a high load condition. Therefore, a special diving control method suitable for the driving under the high load condition at which the driving resistance is increased is required.

SUMMARY

The present disclosure has been made to solve the above-mentioned problems occurring in the prior art while advantages achieved by the prior art are maintained intact. An aspect of the present disclosure provides a driving control apparatus and method for a hybrid vehicle that may improve fuel efficiency by prohibiting a shift between an HEV mode and an EV mode in a hybrid vehicle when the hybrid vehicle satisfies a specific condition.

According to an exemplary embodiment of the present disclosure, a driving control apparatus for a hybrid vehicle may include a vehicle speed calculator configured to detect a driving speed of the vehicle and output information regarding the detected driving speed; an inclination sensor configured to detect an inclination of a road on which the vehicle is being driven and output information regarding the detected inclination; and a mode shift controller configured to determine a driving load of the vehicle based on the driving speed and the inclination and execute the driving mode of the vehicle based on a magnitude of the driving load.

BRIEF DESCRIPTION OF THE DRAWINGS

The above and other objects, features and advantages of the present disclosure will be more apparent from the following detailed description taken in conjunction with the accompanying drawings:

FIG. 2 is an exemplary diagram illustrating a driving load area of a vehicle divided based on a driving speed of the vehicle and an inclination (gradient) of a road.

DETAILED DESCRIPTION

Figure 1:
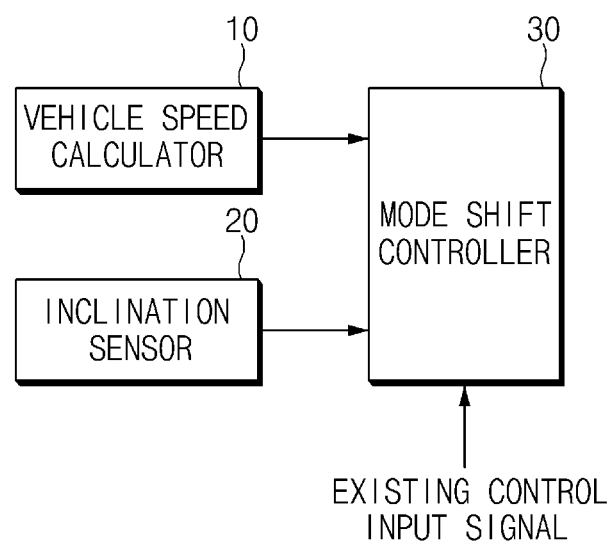
FIG. 1 is an exemplary diagram illustrating a configuration of a driving control apparatus for a hybrid vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. Terms and words used in the present specification and claims are not to be construed as a general or dictionary meaning, but are to be construed as meaning and concepts meeting the technical ideas of the present disclosure based on a principle that the present inventors may appropriately define the concepts of terms in order to describe their disclosures in best mode. Therefore, configurations described in exemplary embodiments and the accompanying drawings of the present specification do not represent all of the technical spirits of the present disclosure, but are merely exemplary embodiments of the present disclosure. Therefore, the present disclosure should be construed as including all the changes, equivalents, and substitutions included in the spirit and scope of the present disclosure at the time of filing this application.

FIG. 1 is an exemplary diagram illustrating a configuration of a driving control apparatus for a hybrid vehicle according to an exemplary embodiment of the present disclosure. The driving control apparatus for FIG. 1 may include a vehicle speed calculator 10, an inclination sensor 20, and a mode shift controller 30.

The vehicle speed calculator 10 may be configured to use sensors mounted within a vehicle to detect a driving speed of the vehicle and transmit information regarding the detected driving speed to the mode shift controller 30. For example, the vehicle speed calculator 10 may be configured to detect a revolution per minute (RPM) of an output shaft of a transmission or the driving speed as a speed of each wheel and convert information regarding the RPM or the driving speed into an electrical signal and provide the information to the mode shift controller 30. When the vehicle is not driven at a substantially constant speed, the vehicle speed calculator 10 may be configured to calculate an average value (e.g., average speed) of a vehicle speed in a preset constant time unit and provide the calculated result as the driving speed.

The inclination sensor 20 may include a tilt angle sensor and may be configured to detect an inclination (e.g., gradient) of a road on which the vehicle is being driven and provide the information regarding the inclination to the mode shift controller 30. The mode shift controller 30 may be configured to execute a driving mode of the vehicle based on a driving load of the vehicle. For example, the mode shift controller 30 may be configured to use the information regarding the driving speed of the vehicle received from the vehicle speed calculator 10 and the information regarding the inclination of the road received from the inclination sensor 20 to execute the driving mode of the vehicle. For this purpose, the mode shift controller 30 may be configured to use the driving speed of the vehicle and the inclination of the road to calculate the driving load of the vehicle and may execute the driving mode to perform a shift between driving modes (EV/HEV) based on the driving load by the existing method or operate the vehicle to be driven in a mode (e.g., engine only mode) which prohibits the shift. In particular, when the mode shift controller 30 determines the driving load using the inclination, an inclination based on flat driving and slope road driving (e.g., substantially flat road and inclined road) is considered and an inclination based on downhill road driving is elimination.

The engine only mode according to the exemplary embodiment of the present disclosure may be a mode which continuously maintains an HEV mode independent of the case in which the vehicle receives a control signal which instructs a conversion of the HEV mode to transfer engine power to a wheel through a motor and a transmission by engaging an engine clutch installed between the engine and the motor into the EV mode by releasing the engine clutch.

FIG. 2 is an exemplary diagram illustrating a driving load area of a vehicle divided based on the vehicle speed (e.g., driving speed) of the vehicle and the inclination (gradient) of the road. According to the exemplary embodiment of the present disclosure, the driving condition of the vehicle may be divided into the flat driving level and at least one slope road driving level (e.g., slope road (small), slope road (middle), and slope road (large)) based on the inclination of the road on which the vehicle is being driven. Further, the driving conditions of the vehicle may be divided into, for example, five levels (e.g., superlow speed, low speed, middle speed, high speed, superhigh speed) based on the driving condition of the vehicle. In particular, reference values for dividing each level based on the inclination and each level based on the vehicle speed may be preset at the time of designing a system.

The mode shift controller 30 may be configured to store the vehicle speed and the inclination in a memory in a table form illustrated in FIG. 2 and determine to which state of the table shown in FIG. 2 the current driving state of the vehicle corresponds by comparing the information regarding the driving speed of the vehicle received from the vehicle speed calculator 10 and the information regarding the inclination of the road received from the inclination sensor 20 with the table shown in FIG. 2 to execute the driving mode of the vehicle based on the determination.

For example, the mode shift controller 30 may first be configured to determine to which level of FIG. 2 the inclination of the vehicle corresponds and then determine to which level of FIG. 2 the driving speed of the vehicle corresponds to determine the driving mode satisfying both conditions (e.g., inclination and vehicle speed) and then operate the vehicle to be driven in the corresponding mode. Further, the mode shift controller 30 may first be configured to determine the driving speed and then determine the inclination to determine the corresponding driving mode.

Figure 3:
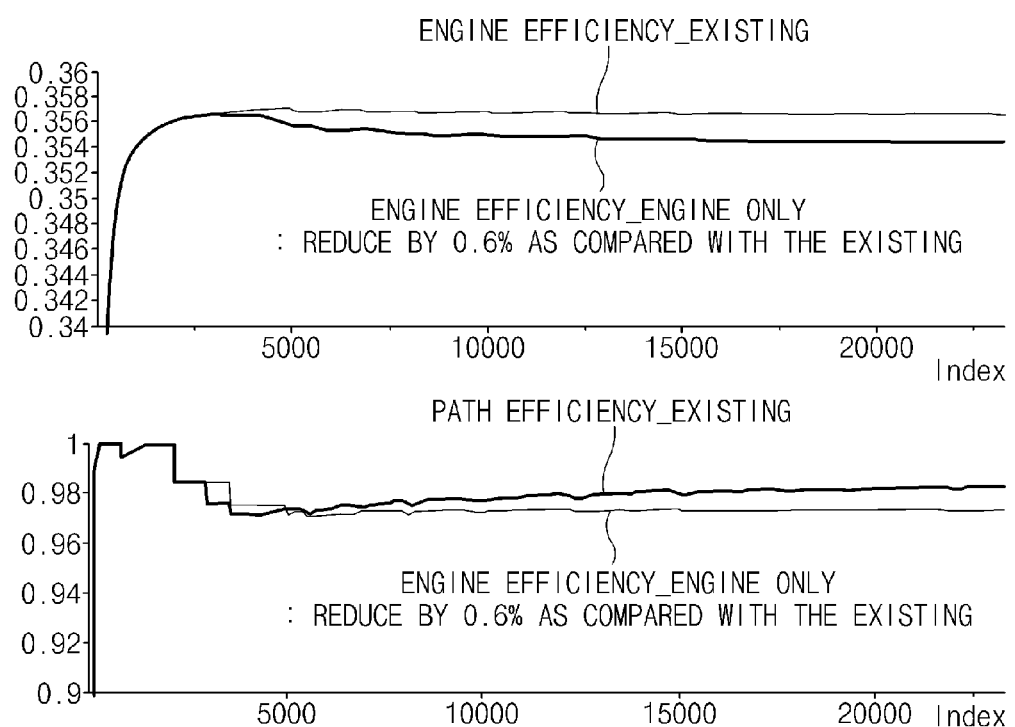
FIG. 3 is an exemplary diagram illustrating simulation results obtained by comparing engine efficiency and path efficiency between when a vehicle is driven based on the existing mode shift control method and when the vehicle is driven based on an engine only mode according to an exemplary embodiment of the present disclosure.

FIG. 3 is an exemplary diagram illustrating simulation results obtained by comparing engine efficiency and path efficiency between when the vehicle is driven based on the existing mode shift control method and when the vehicle is driven based on the engine only mode according to the exemplary embodiment of the present disclosure. FIG. 3 illustrates comparison and analysis results using about 120 km/h constant driving measurement data to stand for overload driving.

Referring to FIG. 3, it may be appreciated that when the vehicle is driven in the engine only mode according to the exemplary embodiment of the present disclosure, the engine efficiency may be reduced by about 0.6% compared to the related art and the path efficiency may be increased by about 1%. In other words, it may be appreciated that when the engine only mode according to the exemplary embodiment of the present disclosure is applied, the overall system efficiency of the vehicle may be enhanced by about 0.4% (1%-0.6%).

As described above, according to the exemplary embodiments of the present disclosure, it may be possible to enhance the fuel efficiency by prohibiting the shift between the HEV mode and the EV mode in the hybrid vehicle when the hybrid vehicle satisfies the specific condition (e.g., condition in which the driving resistance is increased).

The exemplary embodiments of the present disclosure described above have been provided for illustrative purposes. Therefore, those skilled in the art will appreciate that various modifications, alterations, substitutions, and additions are possible without departing from the scope and spirit of the present disclosure as disclosed in the accompanying claims and such modifications, alterations, substitutions, and additions fall within the scope of the present disclosure.

What is claimed is:

1. A driving control apparatus for a hybrid vehicle, comprising:
    a vehicle speed calculator configured to detect a driving speed of a vehicle and output information regarding the detected driving speed;
    an inclination sensor configured to detect an inclination of a road on which the vehicle is being driven and output information regarding the detected inclination; and
    a mode shift controller configured to determine a driving load of the vehicle based on the driving speed and the inclination and execute a driving mode of the vehicle based on a magnitude of the driving load,
    wherein the mode shift controller is configured to drive the vehicle in an angine only mode which prohibits a shift between an electric vehicle (EV) mode and a hybrid electric vehicle (HEV) mode when the driving load meets a present condition.

2. The driving control apparatus according to claim 1, wherein the vehicle speed calculator is configured to calculate an average speed in a preset constant time unit when the vehicle is not driven at a substantially constant speed.

3. The driving control apparatus according to claim 1, wherein the mode shift controller is configured to divide a driving condition of the vehicle into a flat driving condition and at least one slope road driving condition based on the inclination and divide the driving condition of the vehicle into a plurality of vehicle speed levels based on the driving speed to drive the vehicle in the engine only mode in a preset vehicle speed level and inclination level.

4. The driving control apparatus according to claim 3, wherein the mode shift controller is configured to drive the vehicle in the engine only mode independent of the inclination when the vehicle speed corresponds to a preset speed.

5. The driving control apparatus according to claim 1, wherein the mode shift controller is configured to drive the vehicle in the engine only mode independent of the vehicle speed when the inclination corresponds to a preset slope road driving level.

6. A driving control method for a hybrid vehicle, comprising:
    receiving, by a controller, a driving speed of a vehicle;
    receiving, by a controller, an inclination of a road on which the vehicle is being driven using an inclination sensor;
    determine a driving load of the vehicle based on the driving speed and the inclination and execute a driving mode of the vehicle based on a magnitude of the driving load; and
    driving, by the controller, the vehicle in an engine only mode which prohibits a shift between an electric vehicle (EV) mode and a hybrid electric vehicle (HEV) mode when the driving load meets a preset condition.

7. The driving control method according to claim 6, further comprising:
    dividing, by the controller, a driving condition of the vehicle into a flat driving condition and at least one slope road driving condition based on the inclination and divide the driving condition of the vehicle into a plurality of vehicle speed levels based on the driving speed to drive the vehicle in the engine only mode in a preset vehicle speed level and inclination level.

8. The driving control method according to claim 7, further comprising:
    driving, by the controller, the vehicle in the engine only mode independent of the inclination when the vehicle speed corresponds to a preset speed.

9. The driving control method according to claim 6, further comprising:
    driving, by the controller, the vehicle in the engine only mode independent of the vehicle speed when the inclination corresponds to a preset slope road driving level.

10. A non-transitory computer readable medium containing program instructions executed by a controller, the computer readable medium comprising:
    program instructions that receive a driving speed of a vehicle;
    program instructions that control an inclination sensor to determine an inclination of a road on which the vehicle is being driven;
    program instructions that determine a driving load of the vehicle based on the driving speed and the inclination and execute a driving mode of the vehicle based on a magnitude of the driving load; and
    program instructions that drive the vehicle in an engine only mode which prohibits a shift between an electric vehicle (EV) mode and a hybrid electric vehicle (HEV) mode when the driving load meets a preset condition.

11. The non-transitory computer readable medium of claim 10, further comprising:

program instructions that divide a driving condition of the vehicle into a flat driving condition and at least one slope road driving condition based on the inclination and divide the driving condition of the vehicle into a plurality of vehicle speed levels based on the driving speed to drive the vehicle in the engine only mode in a preset vehicle speed level and inclination level.

12. The non-transitory computer readable medium of claim 11, further comprising:

program instructions that drive the vehicle in the engine only mode independent of the inclination when the vehicle speed corresponds to a preset speed.

13. The non-transitory computer readable medium of claim 10, further comprising:

program instructions that drive the vehicle in the engine only mode independent of the vehicle speed when the inclination corresponds to a preset slope road driving level.

* * * * *